(12) United States Patent
He et al.

(10) Patent No.: US 11,106,329 B2
(45) Date of Patent: Aug. 31, 2021

(54) FLIGHT DECK DISPLAY SYSTEMS AND METHODS FOR GENERATING COCKPIT DISPLAYS INCLUDING DYNAMIC TAXI TURNOFF ICONS

(71) Applicant: HONEYWELL INTERNATIONAL INC., Morristown, NJ (US)

(72) Inventors: Gang He, Morristown, NJ (US); Jary Engels, Peoria, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1550 days.

(21) Appl. No.: 14/858,725

(22) Filed: Sep. 18, 2015

(65) Prior Publication Data
US 2017/0083206 A1    Mar. 23, 2017

(51) Int. Cl.
*G06F 3/0481* (2013.01)
*G06F 3/0484* (2013.01)
*G06T 15/00* (2011.01)
*G06T 11/00* (2006.01)
*G09G 5/377* (2006.01)
*G01C 23/00* (2006.01)
*B64D 43/00* (2006.01)
(Continued)

(52) U.S. Cl.
CPC ......... *G06F 3/04817* (2013.01); *B64D 43/00* (2013.01); *G01C 23/005* (2013.01); *G06F 3/04845* (2013.01); *G06T 11/00* (2013.01); *G06T 15/00* (2013.01); *G08G 5/0021* (2013.01); *G08G 5/025* (2013.01); *G09G 5/377* (2013.01); *G09G 2380/12* (2013.01)

(58) Field of Classification Search
CPC ... G01C 23/00; G01C 23/005; G06F 3/04817; G06F 3/04845; B64D 43/00; G06T 11/00
See application file for complete search history.

(56) References Cited

U.S. PATENT DOCUMENTS 5,353,022 A    10/1994    Middletown et al.
5,530,440 A    6/1996    Danzer et al.
(Continued)

FOREIGN PATENT DOCUMENTS

WO    9904304 A1    1/1999

OTHER PUBLICATIONS

Extended EP Search Report for Application No. 16189364.9-1803 dated Jan. 2, 2017.
(Continued)

*Primary Examiner* — Namitha Pillai
(74) *Attorney, Agent, or Firm* — Lorenz & Kopf, LLP

(57) ABSTRACT

Flight deck display systems and methods for generating cockpit displays including dynamic taxi turnoff icons are provided. In one embodiment, the flight deck display system includes a display device, a memory storing an airport map database, and a controller operably coupled to the display device and to the memory. The controller is configured to recall information from the airport map database pertaining to a runway cleared for usage by the aircraft. The controller further identifies a taxi exit along the runway based, at least in part, on the information recalled from the airport map database. The controller then generates a dynamic taxi turnoff icon on the display device including symbology representative of the runway and the location of the taxi exit along the runway.

16 Claims, 3 Drawing Sheets

(51) Int. Cl.
    *G08G 5/00*         (2006.01)
    *G08G 5/02*         (2006.01)

(56)               References Cited

U.S. PATENT DOCUMENTS

| | | | |
|---|---|---|---|
| 6,107,943 | A | 8/2000 | Schroeder |
| 6,862,519 | B2 | 3/2005 | Walter |
| 7,343,229 | B1 * | 3/2008 | Wilson ................ G08G 5/0021 |
| | | | 340/951 |
| 8,604,942 | B2 | 12/2013 | Whitlow et al. |
| 9,429,942 | B2 | 8/2016 | Scacchi |
| 9,472,110 | B2 | 10/2016 | Murthy et al. |
| 2005/0006524 | A1 | 1/2005 | Villaume et al. |
| 2008/0162092 | A1 | 7/2008 | Coulmeau et al. |
| 2010/0299005 | A1 | 11/2010 | Hugues |
| 2011/0196598 | A1 * | 8/2011 | Feyereisen ............ G01C 21/00 |
| | | | 701/120 |
| 2012/0130624 | A1 | 5/2012 | Clark et al. |
| 2014/0257601 | A1 | 9/2014 | Horne et al. |
| 2014/0368359 | A1 * | 12/2014 | Johnson .................. G01P 1/10 |
| | | | 340/969 |

OTHER PUBLICATIONS

Sez, E., "Heads Up Display—Takeoff," Gulfstream G450 Aircraft Operating Manual, Apr. 2013.

* cited by examiner

FLIGHT DECK DISPLAY SYSTEMS AND METHODS FOR GENERATING COCKPIT DISPLAYS INCLUDING DYNAMIC TAXI TURNOFF ICONS

TECHNICAL FIELD

The following disclosure relates generally to flight deck display systems and, more particularly, to flight deck display systems and methods for generating cockpit displays including taxi turnoff symbology.

BACKGROUND

An aircraft exits a runway by turning onto an intersecting taxiway after landing and rollout or, perhaps, after a rejected takeoff attempt. The aircraft can become unstable and possible veer from a taxiway if travelling at too great a speed when turning onto the runway-taxiway juncture (referred to herein as a "taxi exit"). For this reason, airports commonly post speed limits to which aircraft are required to adhere when exiting a runway. The taxi exit speed limit is often relatively low and may be, for example, 20 nautical miles or less. Certain taxiways, however, are designed to allow aircraft turnoff at higher speed limits when exiting the runway, such as 30 or 40 nautical miles. Such taxiways are commonly referred to as "high speed" or "rapid exit" taxiways and are typically located at airports accommodating relatively large volumes of traffic. By allowing incoming aircraft to exit runways in a relatively expedient manner, rapid exit taxiways help promote smooth traffic flow and can boost overall traffic throughput.

The speed at which an aircraft turns onto a taxiway when exiting a runway and, by extension, the rate at which an aircraft decelerates to achieve the taxi turnoff speed has a direct effect on aircraft stability and airport traffic flow. Despite this, few, if any existing flight deck display systems provide symbology offering intuitive and prominent visual cues assisting a pilot in achieving an ideal turnoff speed when transitioning from a runway to an adjoining taxiway. There thus exists an ongoing need for flight deck display systems and methods providing such a functionality, as well as other functionalities aiding pilot decision making when exiting a runway after landing or rejected takeoff. Other desirable features and characteristics of the present invention will become apparent from the subsequent Detailed Description and the appended Claims, taken in conjunction with the accompanying Drawings and the foregoing Background.

BRIEF SUMMARY

Flight deck display systems for generating cockpit displays including dynamic taxi turnoff icons are provided. In one embodiment, the flight deck display system includes a display device, a memory storing an airport map database, and a controller operably coupled to the display device and to the memory. The controller is configured to recall information from the airport map database pertaining to a runway cleared for usage by the aircraft. The controller further identifies a taxi exit along the runway based, at least in part, on the information recalled from the airport map database. The controller generates a dynamic taxi turnoff icon on the display device including symbology representative of the runway and the location of the taxi exit along the runway.

In another embodiment, the flight deck display system includes a display device, an ownship data source configured to monitor the current position of the aircraft, and a controller coupled to the display device and to the ownship data source. The controller is configured to generate three dimensional Primary Flight Display (PFD) on the display device and to superimpose a two dimensional icon on the three dimensional PFD. The two dimensional icon includes, at minimum, a runway symbol representing a runway cleared for usage by the aircraft and an aircraft symbol representing the current position of the aircraft on the runway.

Embodiments of a method carried-out by the flight deck display system of an aircraft are further provided. The flight deck display system can include a display device, a memory storing an airport map database, and a controller operably coupled to the display device and to the memory. In an embodiment, the method includes recalling information from the airport map database pertaining to a runway cleared for usage by the aircraft. A taxi exit is identified along the runway based on the information recalled from the airport map database. A dynamic taxi turnoff icon is then generated on the display device including symbology representative of the runway and the location of the taxi exit along the runway.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
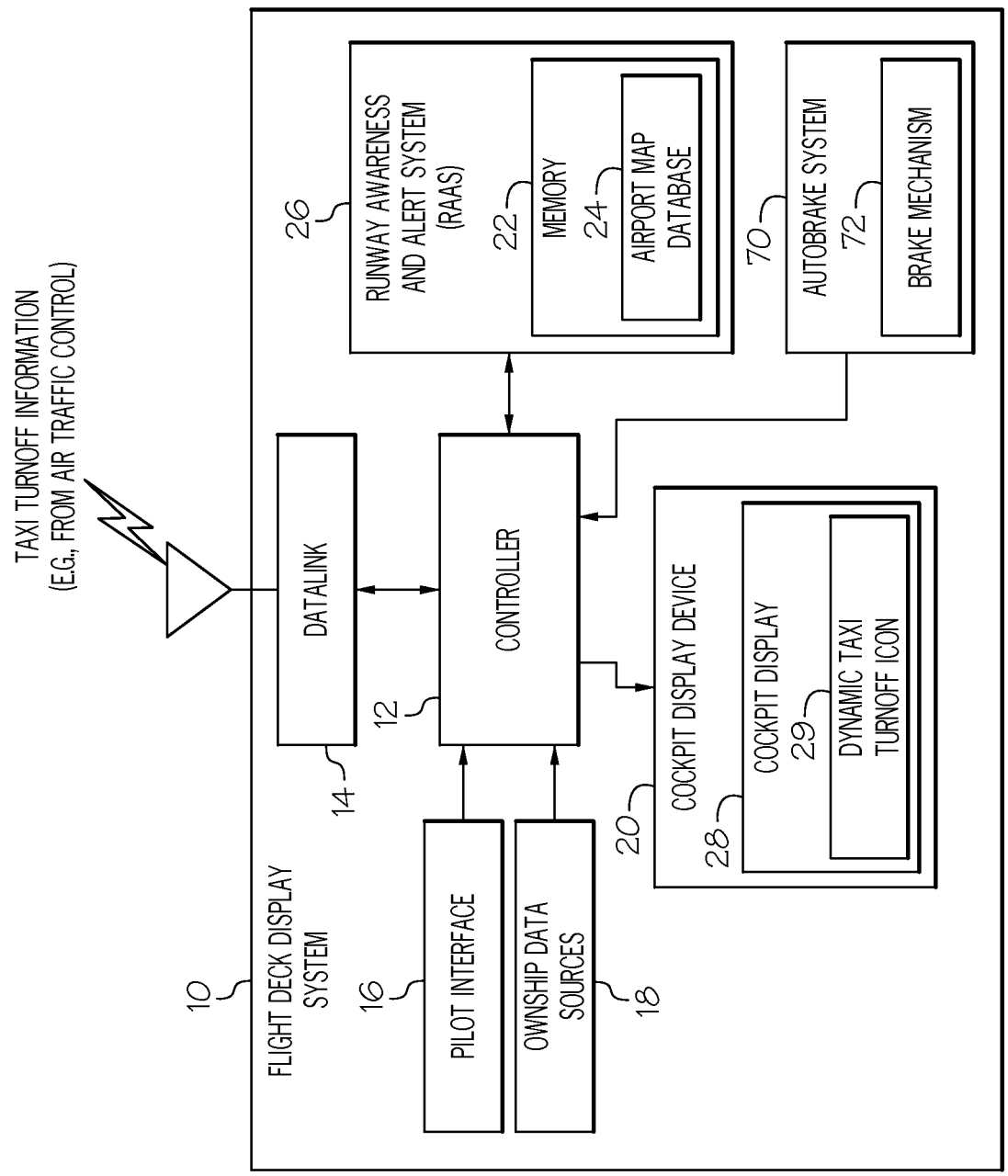
FIG. 1 is a block diagram of a flight deck display system suitable for generating a dynamic taxi turnoff icon, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description. As appearing herein, the term "pilot" encompasses all members of an aircrew. The term "cockpit display," as further appearing herein, refers to a graphical display, such as a Primary Flight Display or other perspective view display, generated on a display device while located in the cockpit of an aircraft. Finally, the term "cockpit display" refers to an image produced on the screen of an image-generating monitor or display device when operating in the cockpit of an aircraft. A given display can occupy the entire screen of a monitor or, perhaps, a limited portion thereof.

The following describes embodiments of flight deck display systems and methods for generating cockpit displays including dynamic taxi turnoff icons. The taxi turnoff icons are "dynamic" in the sense that a given icon includes at least one graphic element or symbol, which is visually manipulated to convey taxi turnoff information to the pilot of an aircraft (A/C) during takeoff or landing. The particular symbology featured by the taxi turnoff icon may vary amongst embodiments in type, appearance, and disposition.

In general, the taxi turnoff icon may include symbology representative of the runway presently utilized by the A/C for takeoff or landing purposes, the current A/C position on the runway, and the location of one or more taxi exits along the runway. In preferred embodiments, the taxi turnoff icon also includes a marker denoting a point along the runway at which A/C speed is projected to decline to a maximum turnoff speed assigned the taxi exit; and/or a marker denoting a point along the runway at which the A/C is projected to reach full stop. As a still further possibility, embodiments of the taxi turnoff icon can include graphics or symbology identifying a particular taxi exit as the "designated" or "planned" exit when multiple exits are present along the runway's length. The taxi turnoff icon can be superimposed over a perspective view display, such as a Primary Flight Display (PFD), and generated as a two dimensional graphic to minimize display clutter. When produced on a PFD including a movable Flight Path Marker (FPM), the position of the taxi turnoff icon can be fixed relative to and located adjacent the FPM for increased visual prominence.

When generated on a PFD or other cockpit display, the dynamic taxi turnoff icon provides an intuitive visual tool for assisting a pilot in determining an optimal manner in which to efficiently and safely exit a runway after landing or rejected takeoff. By glancing at the taxi turnoff icon, a pilot can rapidly ascertain the current A/C position with respect to the location of the taxi exit or exits along the runway. Additionally, when the taxi turnoff icon includes a maximum turnoff speed marker, a pilot can reference the position of the marker in determining an appropriate rate of deceleration required for the A/C to reach an ideal turnoff speed for exiting the runway. This is highly useful. Embodiments of the dynamic taxi turnoff icon can visually express other information useful in transitioning from a runway to a taxiway after touchdown and rollout or rejected takeoff, as will become apparent from the following description. An exemplary embodiment of a flight deck display system suitable for generating a dynamic taxi turnoff icon will now be described in conjunction with FIG. 1.

FIG. 1 is a schematic of a flight deck display system 10, as illustrated in accordance with an exemplary embodiment of the present invention. Flight deck display system 10 includes the following components, each of which may be comprised of multiple devices, systems, or elements: (i) a controller 12, (ii) a datalink 14 (iii) a pilot interface 16 (iii) one or more ownship data sources 18, (v) a cockpit display device 20, and (vi) a memory 22 containing an airport map database 24. The foregoing components can be interconnected utilizing any suitable aircraft interconnection architecture, whether wired, wireless or a combination thereof. In many cases, the foregoing components will communicate over an avionics bus, which permits bidirectional signal communication with controller 12. The individual elements and components of flight deck display system 10, then, can be implemented in a distributed manner using any number of physically-distinct and operatively-interconnected pieces of hardware or equipment.

During operation of display system 10, controller 12 drives cockpit display device 20 to selectively produce a dynamic taxi turnoff icon 29. As schematically represented in FIG. 1, dynamic taxi turnoff icon 29 can be generated when the aircraft equipped with display system 10 (referred to herein as the "ownship A/C") is presently utilizing or is approaching a runway for takeoff or landing purposes. Controller 12 may also drive display device 20 to generate a cockpit display 28 over which the taxi turnoff icon is superimposed. In certain embodiments, cockpit display 28 may be a two dimensional (2D) display, such as a navigational display or a 2D Airport Moving Map (AMM). However, in preferred embodiments, cockpit display 28 is a three dimensional or perspective view display and, specifically, a PFD. When the ownship A/C is located on, above, or in close vicinity to an airport surface, the images produced on the PFD may depict an airport and its associated surfaces (runways, taxiways, and the like), which may be referred to as a "three dimensional AMM." Exemplary embodiment of a taxi turnoff icon superimposed over a PFD including a three dimensional AMM are discussed more fully below in conjunction with FIGS. 2-4. First, however, the components included within flight deck display system 10 are described, in turn, below.

As schematically illustrated in FIG. 1, controller 12 can include or assume the form of any electronic device, system, or combination of devices suitable for performing processing and display function described herein. In this regard, controller 12 can be implemented utilizing any suitable number of individual microprocessors, navigational equipment, memories, power supplies, storage devices, interface cards, and other standard components known in the art. Additionally, the controller 12 may include or cooperate with any number of software programs (e.g., flight deck display programs) or instructions designed to carry-out various methods, process tasks, calculations, and display functions.

Display device 20 can assume the form of any monitor or image-generating device suitable for generating cockpit display 28. Display device 20 may be affixed to the static structure of the aircraft cockpit and positioned in either Heads Down Display (HDD) or Heads Up Display (HUD) configuration. Alternatively, display device 20 can be a near-to-eye, helmet-mounted, or other pilot-worn display device. When assuming the form of a pilot-worn display device or a HUD display device affixed to the aircraft cockpit, the screen of display device 20 may be fully or partially transparent and the below-described usable runway length symbology may be superimposed on over the "real world view" of a runway and its surrounding environment, as seen through the transparent display screen. In still further embodiments, display device 20 can assume the form of a portable electronic display device, such as a tablet computer or Electronic Flight Bag (EFB), which is carried into the A/C cockpit by a pilot and which communicates with the A/C avionics over a physical or wireless connection to perform the below-described display functions.

Ownship data sources 18 generate, measure, and/or provide different types of data related to the operational status of the ownship A/C, the operational environment of the ownship A/C, flight parameters, and the like. Ownship data sources 18 can include or cooperate any number of avionics systems including, but not limited to, a Flight Management System (FMS), an Inertial Reference System (IRS), and/or an Attitude Heading Reference System (AHRS). Data provided by the sources of ownship data sources 18 may include, without limitation: airspeed data; groundspeed data; altitude data; attitude data including pitch data and roll data; yaw data; geographic position data, such as Global Positioning System (GPS) data; time/date information; heading information; weather information; flight path data; track data; radar altitude; geometric altitude data; wind speed data; wind direction data; fuel consumption; etc. Flight deck display system 10 is suitably designed to process data obtained from the sources of ownship data sources 18 in the manner described in more detail herein. In particular, flight deck display system 10 can utilize flight status data of the ownship aircraft when rendering cockpit display 28 and dynamic taxi turnoff icon 29, as described below in conjunction with FIGS. 2-4.

Memory 22 of flight deck display system 10 can include any number of volatile and/or non-volatile memory elements. In many embodiments, memory 22 will include a central processing unit register, a number of temporary storage areas, and a number of permanent storage areas. Memory 22 can also include one or more mass storage devices, such as magnetic hard disk drives, optical hard disk drives, flash memory drives, and the like. As schematically indicated in FIG. 1, memory 22 stores an airport map database 24. Airport map database 24 can be a collection of stored information pertaining to runways, airport layouts, and the like useful in performing the functions described herein. Of particular relevance, airport map database 24 can store the locations, lengths, and other such parameters pertaining to runways located within at least the operational range of the ownship A/C. Periodic updates to airport map database 24 may be provided by a global datacenter or other remote source and communicated to display system 10 utilizing, for example, datalink 14.

Airport map database 24 can be integrated into any suitable system or subsystem of flight deck display system 10. For example, as indicated in FIG. 1, airport map database 24 may be included within a Runway Awareness and Advisory System (RAAS) system 26 utilized in the generation of "Short Runway" alerting functions. In one embodiment, RAAS 26 is a SMARTRUNWAY® and/or a SMART-LANDING® system developed and commercially marked by the assignee of the present application, Honeywell International Inc., currently headquartered in Morristown, N.J. While controller 12 and RAAS 26 are illustrated as distinct blocks in FIG. 1, it will be appreciated that controller 12 can be integrated into or may be part of RAAS 26 or another aircraft system, such as an FMS, in actual implementations of flight deck display system 10.

During operation of display system 10, controller 12 obtains data utilized in the generation of dynamic runway turnoff icon 29. The particular data obtained by controller 12 will vary in conjunction with the graphic elements included within turnoff icon 29. Generally, controller 12 may receive information relating to the layout of the runway including the location of taxi exits, the runway length, the position of the ownship A/C along the runway, and possibly the maximum turnoff speeds associated with the taxi exits. The location of the taxi exits, the runway length, and the maximum turnoff speeds can be recalled from airport map database 24. Alternatively, such data can be manually entered into display system 10 by a pilot utilizing pilot interface 16. In this regard, pilot interface 16 can include any number of input devices (e.g., switches, dials, buttons, keyboards, cursor devices, cameras, microphones, etc.) suitable for receiving pilot input. The pilot may determine parameters form a voice transmission or a digital transmission received from ATC, airline dispatch, or other aircraft. Such transmissions can be provided as a Pilot Report (PIREP), a digital Notice to Airmen (NOTAM), and/or an Automated Terminal Information Service (ATIS) transmission. As a still further possibility, the runway layout information and/or the maximum turnoff speed data can be wirelessly communicated to controller 12 by a remote source. A combination of the foregoing approaches can also be employed. For example, in one embodiment, controller 12 can recall the location of the taxi exits, the runway length, and the maximum turnoff speeds can be recalled from airport map database 24; however, any of the foregoing data can be corrected or overridden by a pilot input or by a communication received over datalink 14 by an authorized control source, such as an Air Traffic Control (ATC). In this manner, an ATC communication or clearance can vary the maximum turnoff speed for a particular taxi exit, as desired. For example, the maximum turnoff speed can be increased when it is desired to accelerate the flow of traffic. Alternatively, the maximum turnoff speed can be decreased when, for example, other aircraft have previously veered-off the taxiway near the exit point or the taxiway surface conditions (e.g., the presence of debris, water, or the like) warrant greater caution when exiting the runway.

Figure 2:
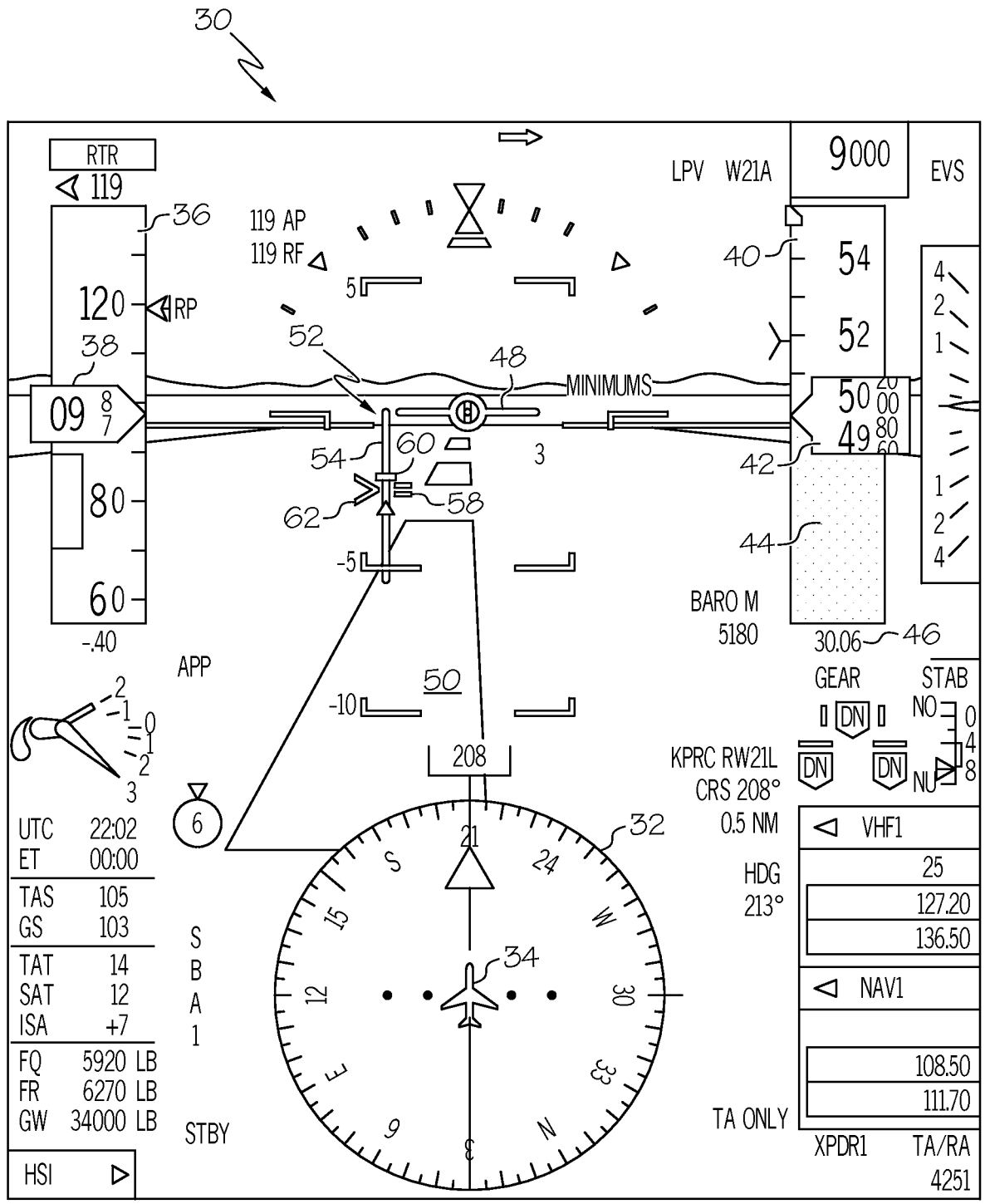
FIG. 2 is a screenshot of an exemplary Primary Flight Display (PFD) generated by the flight deck display system shown in FIG. 1 and including a dynamic taxi turnoff icon, as illustrated in accordance with a further exemplary embodiment.

Turning now to FIG. 2, there is shown an exemplary PFD 30 generated on display device 20 by controller 12 during operation of flight deck display system 10 (FIG. 1) in accordance with an exemplary and non-limiting embodiment of the present invention. PFD 30 is specific type of cockpit display and thus generally corresponds with cockpit display 28 shown in FIG. 1. PFD 30 includes various graphic elements and symbology, which visually conveys the current flight parameters of the ownship A/C and its environmental surroundings. With the exception of taxi turnoff icon 52 (described below), many of the graphic elements rendered on PFD 30 are well-known within the avionics industry and will not be described in detail herein. However, for completeness, it is briefly observed that PFD 30 includes the following graphic elements: a compass 32 centered about an A/C icon 34 (located in the bottom center of PFD 30); an airspeed indicator or "airspeed tape" 36, which features a precision readout window 38 (located in the upper left corner of PFD 30); an altitude indicator or "altitude tape" 40, which features a precision readout window 42 (located in the upper right corner of PFD 30) and a ground filled region 44; a barometric pressure setting readout 46 (located beneath altitude tape 40); and a flight path vector graphic or flight path marker (FPM) 48, which moves across PFD 30 to reflect changes in the flight path of the ownship A/C.

PFD 30 is a perspective view Synthetic Vision System (SVS) display including graphical renderings of terrain and other geographical features representing the view from the cockpit under ideal visibility conditions (a so-called "glass cockpit" view). In the scenario illustrated in FIG. 2, the ownship A/C is in the process of landing onto a runway cleared for usage by the A/C. The simulated "glass cockpit" view produced on PFD 30 thus includes a runway graphic 50, which represents the real world runway along which the ownship A/C is presently traveling. Additionally, and in accordance with an exemplary embodiment of the present invention, controller 12 has generated PFD 30 to include a dynamic taxi turnoff icon 52. Dynamic taxi turnoff icon 52 is introduced onto PFD 30 (preferably, by fading-in or otherwise appearing in a non-abrupt manner) at a suitable juncture pending aircraft takeoff or landing. The particular point at which dynamic taxi turnoff icon 52 initially appears on PFD 30 will vary amongst embodiments, but preferably occurs in conjunction with or after to physical contact between the ownship A/C and the runway. After the ownship A/C exits the runway, taxi turnoff icon 52 may then fade-out or otherwise be removed from PFD 30.

As noted above, the particular graphic elements included within dynamic taxi turnoff icon 52 will vary amongst embodiments, as will the appearance and disposition of the graphic elements. In the exemplary embodiment shown in FIG. 2, dynamic taxi turnoff icon 52 includes the following symbols or graphics: (i) a runway symbol 54, (ii) an A/C symbol 56 (not shown in FIG. 2), (iii) a taxi exit symbol 58, (iv) a projected A/C stop point 60, and (v) position for reaching a maximum turnoff speed ($TS_{MAX}$) marker 62. These symbols are each preferably generated as relatively simple two dimensional shapes to minimize display clutter and avoid unnecessary obstruction of the "glass cockpit view" provided by on PFD 30. In the illustrated embodiment, and by way of non-limiting example only, runway symbol 54 is generated as a relatively long vertical line segment; A/C symbol 56 is generated as a relatively simple shape (e.g., a triangle) reminiscent of a planform aircraft shape and overlaid on runway symbol 54; taxi exit symbol 58 is generated as two parallel lines similar to an equal sign, which are produced adjacent runway symbol 54 at a location corresponding to a real world taxi exit; projected A/C stop point 60 is generated as a relatively short horizontal line, which overlays or crosses runway symbol 54; and $TS_{MAX}$ marker 62 is generated as a V-shaped pointer or chevron, which is positioned adjacent and appears to slide along the length of runway symbol 54 in the manner described below. When generated in a default format, the foregoing symbols are preferably rendered in informational colors (rather than caution or alert colors) as chosen in accordance with a pre-established color coding scheme. In one embodiment, symbols 54, 56, and 58 may be color coded blue under normal operating conditions; while projected A/C stop point 60 and $TS_{MAX}$ marker 62 are color coded green and white, respectively. The number, type, and appearance of the symbols or graphic elements included within taxi turnoff icon 52 can vary in further embodiments. For example, in a further embodiment, $TS_{MAX}$ marker 62 could be generated as a circular marker or donut-shaped graphic.

The length of runway symbol 54 is preferably varied based upon the length of the real world runway, which may be recalled from airport map database 24 or otherwise determined. In further embodiments, the length of runway symbol 54 may be fixed. In either case, taxi exit symbol 58 is generated to be positioned along runway symbol 54 at a location corresponding to a real world taxi exit of the runway utilized by the ownship A/C. Again, the location of the real world taxi exit may be recalled from airport map database 24 or otherwise determined. A/C symbol 56 may first appear when the ownship A/C contacts the runway surface; e.g., upon touchdown during landing. Controller 12 adjusts the position of A/C symbol 56 on runway symbol 54 to represent the actual position of the ownship A/C along the runway. Controller 12 can determine the ownship A/C position along the runway and when the ownship A/C contacts the runway surface based upon information supplied by ownship data sources 18. Controller 12 can also use the information supplied by data sources 18 to project the point along the runway surface at which the ownship A/C will reach a complete stop. Controller 12 can determine the projected full point by, for example, estimating distance require for the aircraft to reach a zero speed by, for example, first calculating the current speed trend of the ownship A/C. Controller 12 may then generate projected A/C stop point 60 at a position along runway symbol 54 corresponding to the projected stop point of the ownship A/C aircraft along the runway. Controller 12 may update taxi turnoff icon 52 continually or at least at a relatively rapid refresh rate to repeatedly adjust the positions of A/C symbol 56 and projected A/C stop point 60 relative to the other static graphics of icon 52 and thereby provide a real time or near real time indication of the position of ownship A/C and the projected A/C stop point.

$TS_{MAX}$ marker 62 identifies a point along the runway at which the aircraft speed is projected to decline to maximum turnoff speed for the taxi exit represented by symbol 58. As the speed trend or motion state of the ownship A/C changes, $TS_{MAX}$ marker 62 may appear to slide along runway symbol 54. When $TS_{MAX}$ marker 62 is located between taxi exit symbol 58 and A/C symbol 56, it can generally be assured that the speed of the ownship A/C will be less than the maximum turnoff speed when exiting the runway utilizing the taxi exit represented by symbol 58. Additionally, a pilot can reference dynamic taxi turnoff icon 52 when controlling the rate at which the ownship A/C decelerates to minimize the separation between $TS_{MAX}$ marker 62 and taxi exit symbol 58 to promote an efficient exit. Controller 12 can determine the appropriate positioning of $TS_{MAX}$ marker 62 based upon a $TS_{MAX}$ value and the current motion state of the ownship A/C. As previously noted, $TS_{MAX}$ can be determined in a number of manners. In one embodiment, $TS_{MAX}$ is recalled from airport map database 24 stored in memory 22. In this case, controller 12 may utilize data stored in memory 22 to classify the runway cleared for usage by the aircraft as a particular class of taxi exit (e.g., a "normal" or "high speed" taxi exit), and then determine a corresponding $TS_{MAX}$ utilizing a two dimensional look-up table. In other embodiments, the $TS_{MAX}$ value can be set by the pilot utilizing pilot interface 16. As a still further possibility, the $TS_{MAX}$ value can be contained within data (e.g., an ATC communication or clearance) received wirelessly over datalink 14. Finally, the current motion state of the ownship A/C can be determined by information provided by ownship data sources 18. The position of $TS_{MAX}$ marker 62 can also be dynamically adjusted in response to a change in taxi exits at which the ownship A/C is expected to turn.

$TS_{MAX}$ marker 62 and the other graphical elements of dynamic taxi turnoff icon 52 (e.g., projected A/C stop point 60) thus provide intuitive visual cues by which a pilot can gauge whether the deceleration of the ownship A/C is adequate for taxi turnoff purposes and to avoid any potential excursion from the runway and adjoining taxiway. With reference to $TS_{MAX}$ marker 62, specifically, deceleration of the ownship A/C is ideally sufficient to ensure that A/C symbol 56 will reach the point along runway graphic 54 designated by $TS_{MAX}$ marker 62 prior to or concurrent with arriving at taxi exit symbol 58. Deceleration of the ownship A/C can be controlled automatically by controller 12 or by another aircraft system, such as an autobrake system to which controller 12 supplies data indicative of the established $TS_{MAX}$ value and/or the current $TS_{MAX}$ marker position along the runway. To emphasize this point, flight deck display system 10 is further illustrated in FIG. 1 as including an autobrake system 70, which is operable coupled to controller 12 and which contains an aircraft brake mechanism 72. Autobrake systems of this type are commonly deployed onboard A/C to provide automatic braking functionalities by engaging the A/C brake mechanism (e.g., brake hydraulics) to gradually bring the A/C to a stop after touchdown or rejected takeoff. By integrating the taxi turnoff data into autobrake system functionality, and specifically by providing $TS_{MAX}$ data to autobrake system 70 for usage in calculating a desired A/C deceleration schedule, embodiments of flight deck display system 10 can further reduce pilot workload and ensure that the ownship A/C is slowed in a highly controlled manner prior to taxi turnoff to reduce component wear and provide uniform deceleration. Autobrake system 70 can also allow the pilot enter certain data (e.g., runway surface condition data) and adjust certain settings (e.g., the abruptness or intensity with which the system applies the brake mechanism) utilizing the aircraft instrument panel. Alternatively, the pilot can manually control the deceleration of the ownship A/C by controlling manual brake pressure and by utilizing other drag devices deployed on the A/C, as needed.

Figure 3:
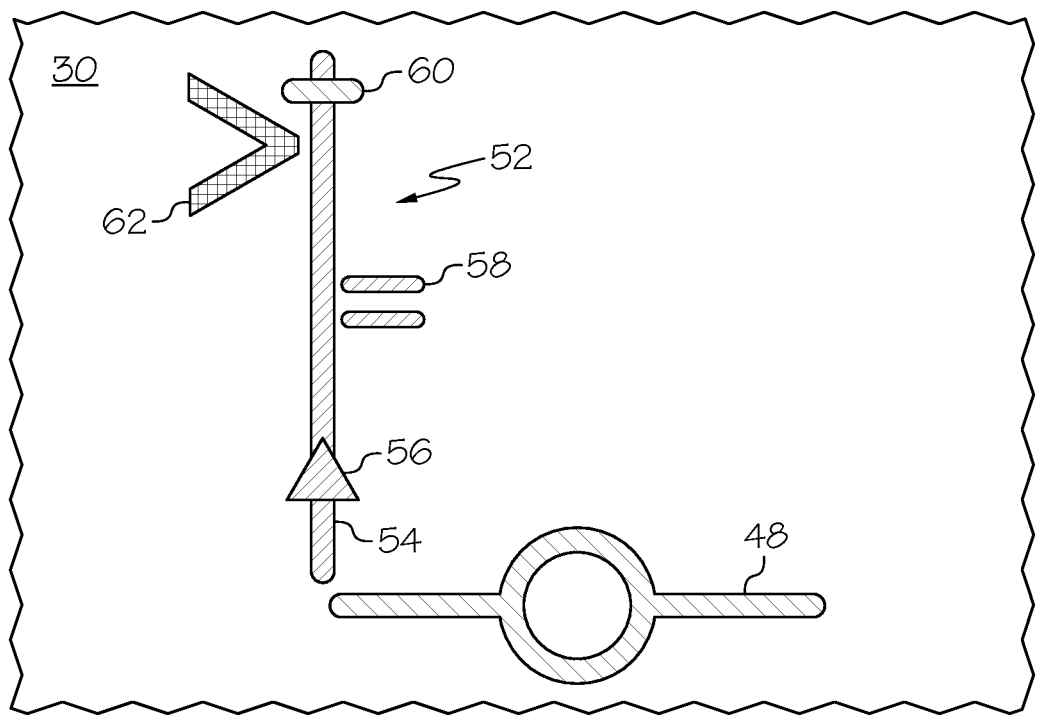
FIGS. 3 and 4 are screenshots of a portion of the PFD shown in FIG. 2 illustrating the dynamic taxi turnoff icon in greater detail and in different exemplary scenarios.

The appearance of dynamic taxi turnoff icon 52 can be varied to generate visual alerts and convey other information useful in determining an optimal manner in which to transition from a runway to a taxiway after landing or rejected takeoff. For example, a visual alert can be generated if the present position of $TS_{MAX}$ marker is located beyond the taxi exit by an amount greater than a predetermined threshold. An example of such an alert condition is shown in FIG. 3 wherein the separation between $TS_{MAX}$ marker 62 and taxi exit symbol 58 exceeds a predetermined threshold. Here, controller 12 has altered the appearance of dynamic taxi turnoff icon 52 to generate a visual alert cautioning the pilot that the ownship A/C may be unable to safely turn at the taxi exit unless the ownship A/C is decelerated more rapidly. This visual alert can be implemented by changing the appearance of turnoff icon 52 in any number of manners. In the illustrated example, specifically, $TS_{MAX}$ marker 62 is generated to have an increased size and color coded to a predetermined caution color, such as amber. This color change and the other changes described hereafter are represented by different cross-hatching patterns in FIGS. 3 and 4. In further embodiments, the appearance of taxi turnoff icon 52 can be changed in other manners to generate alerts and the alerts can increase in urgency depending upon the severity of the alert condition. For example, in the case of a higher level alert, certain elements can be rendered in a predetermined warning color (e.g., red) or animation (e.g., flashing) can be applied to one or more of the graphic elements included within taxi turnoff icon 52.

In embodiments wherein the runway has multiple taxi exits, controller 12 may identify one of the taxi exits as a "planned" or "designated" taxi exit. Controller 12 can identify the planned taxi exit from pilot input, from clearance data entered into flight deck display system 10, and/or from data entered into another aircraft system, such as taxiing data entered into the interface of the Flight Management System. Controller 12 may then generate dynamic taxi turnoff icon 52 to visually distinguish the planned taxi exit from the other taxi exits. This can be done by simply suppressing display of the symbology representing the other taxi exits, which advantageously simplifies icon 52 to reduce display clutter. In this case, if it should be determined that the ownship A/C cannot safely turnoff at the planned taxi exit, the symbol representative of the planned taxi exit may be removed (e.g., fade-out) from icon 52 and a new symbol representative of an alternative taxi exit may be introduced. As a still further possibility, symbology can be generated on taxi turnoff icon 52 representing one or more of the other non-planned taxi exits in addition to the planned taxi exit. In this case, the planned taxi exit is preferably visually distinguished from the other displayed taxi exit(s) in some manner. Consider, for example, the variation of dynamic taxi turnoff icon 52 shown in FIG. 4. In this example, taxi turnoff icon 52 is generated to include a planned taxi exit symbol 64, as well as a secondary or auxiliary taxi exit symbol 66. The planned taxi exit symbol 64 is visually distinguishable by a more pronounced appearance (e.g., a larger size) relative to auxiliary taxi exit symbol 66. Additionally, if desired, a turn arrow symbol 68 can be generated adjacent the planned taxi exit symbol 64. In this manner, a pilot can readily determine the location of planned taxi exit relative to the current A/C position by glancing at taxi turnoff icon 52, while further being apprised of the location of an auxiliary taxi exit should the pilot choose to bypass the planned taxi exit for any reason.

Figure 4:
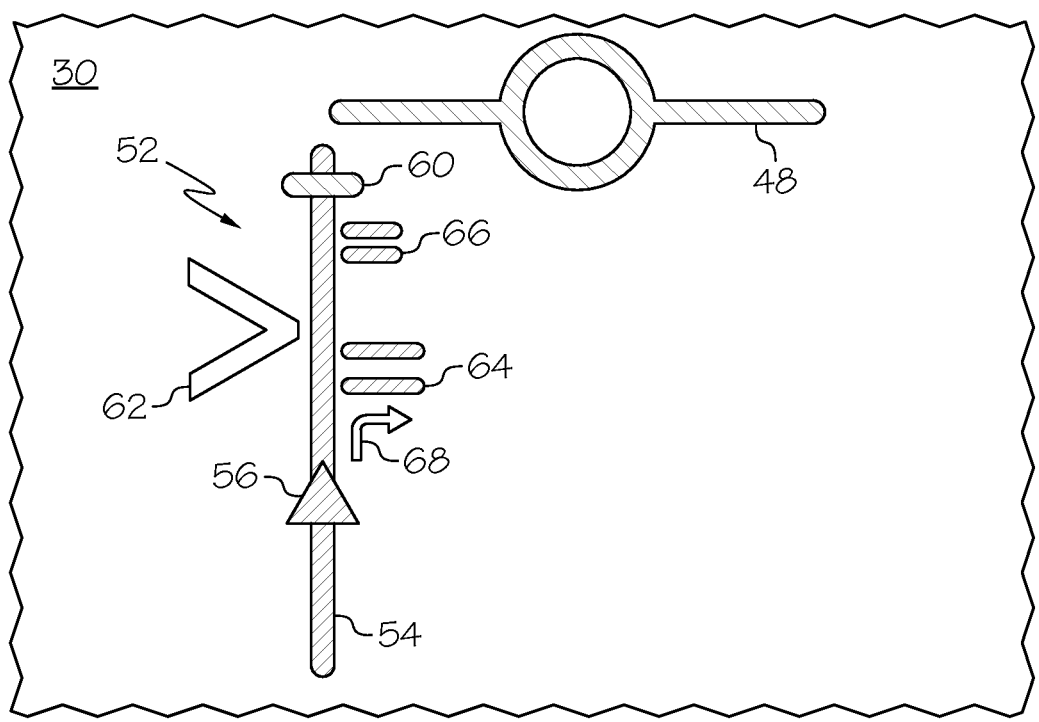

The particular position at which dynamic taxi turnoff icon 52 is generated on PFD 30 or another cockpit display will vary amongst embodiments. In one embodiment, dynamic taxi turnoff icon 52 is generated adjacent to FPM 48 for visual prominence. Additionally, the position turnoff icon 52 may be fixed with respect to FPM 48 and, thus, move in conjunction therewith. Furthermore, in at least some embodiments, the fixed position of dynamic taxi turnoff icon 52 relative to FPM 48 can be determined based upon whether the ownship A/C is the process of takeoff from or landing at the runway depicted on PFD 30. For example, controller 12 can generate dynamic taxi turnoff icon 52 at a position adjacent and generally below FPM 48 when the ownship A/C is cleared to land at the runway represented by symbol 54, as generally shown in FIG. 3. Conversely, controller 12 can generate dynamic taxi turnoff icon 52 at a position adjacent and generally above FPM 48 when the ownship A/C is cleared to takeoff from the runway represented by symbol 54, as generally shown in FIG. 4.

The foregoing has thus provided embodiments of a flight deck display system and method for generating cockpit displays including dynamic taxi turnoff icon. Embodiments of the above-described flight deck display system can include symbology representative of the runway, the A/C position on the runway, and a planned taxi exit along the runway. In certain embodiments, the taxi turnoff icon can also include a marker or other symbol indicating a point along the runway at which A/C is predicted to reach or fall below a maximum turnoff speed for the planned taxi exit. The dynamic taxi turnoff icon can be generated on any cockpit display and positioned in various different locations location. The dynamic taxi turnoff icon is conveniently generated on a PFD and fixed relative to the FPM. A pilot can thus reference the taxi turnoff icon to quickly gain situational awareness regarding the position of the A/C relative to the planned taxi exit, as well as whether the rate of A/C deceleration is sufficient to bring the aircraft speed into conformity with the maximum turnoff speed prior to reaching the planned taxi exit. Embodiments of the taxi turnoff icon can also visually convey other information to the pilot useful in decision making during takeoff and landing, such as the remaining runway length or the location of other taxi exit points along the runway.

Although an exemplary embodiment of the present invention has been described above in the context of a fully-functioning computer system (e.g., flight deck display system 10 described above in conjunction with FIG. 1), those skilled in the art will recognize that the mechanisms of the present invention are capable of being distributed as a program product and, furthermore, that the teachings of the present invention apply to the program product regardless of the particular type of computer-readable media (e.g., floppy disc, hard drive, memory card, optical disc, etc.) employed to carry-out its distribution. In certain implementations, the flight deck display system may comprise graphical user interface (e.g., ARINC 661) components, which may include a user application definition file ("UADF"). As will be appreciated by one skilled in the art, such a UADF is loaded into the flight deck display system and defines the "look and feel" of the display, the menu structure hierarchy, and various other static components of the graphic user interface.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A flight deck display system for deployment onboard an aircraft, the flight deck display system comprising:
   a display device;
   a memory storing an airport map database; and
   a controller operably coupled to the display device and to the memory, the controller configured to:
      recall information from the airport map database pertaining to a runway cleared for usage by the aircraft;
      identify a taxi exit along the runway based, at least in part, on the information recalled from the airport map database;
      generate a dynamic taxi turnoff icon on the display device including symbology representative of the runway and the location of the taxi exit along the runway; and
      establish a maximum turnoff speed ($TS_{MAX}$) for the taxi exit;
      generate the dynamic taxi turnoff icon to include a $TS_{MAX}$ marker identifying a point along the runway at which the aircraft speed is projected to decline to $TS_{MAX}$.

2. The flight deck display system of claim 1 wherein the controller is further configured to generate a perspective view display on the display device over which the dynamic taxi turnoff icon is superimposed.

3. The flight deck display system of claim 2 wherein the perspective display comprises a Primary Flight Display including a movable Flight Path Marker (FPM), and wherein the controller generates the dynamic taxi turnoff icon to have a positioned fixed with respect to the movable FPM.

4. The flight deck display system of claim 3 wherein the controller is further configured to:
   generate the dynamic taxi turnoff icon at a position adjacent and generally below the movable FPM when the aircraft is cleared to land at the runway; and
   generate the dynamic taxi turnoff icon at a position adjacent and generally above the movable FPM when the aircraft is cleared to takeoff from the runway.

5. The flight deck display system of claim 1 wherein, when the runway cleared for usage by the aircraft includes multiple taxi exits, the controller is further configured to:
   identify a planned taxi exit from among the multiple taxi exits; and
   generate the dynamic taxi turnoff icon to visually distinguish the planned taxi exit from the other taxi exits included in the multiple taxi exits.

6. The flight deck display system of claim 5 wherein the controller is further configured to:
   identify an auxiliary taxi exit from among the multiple taxi exits; and
   generate the dynamic taxi turnoff icon to include a symbol representative of the auxiliary taxi exit.

7. The flight deck display system of claim 1 further comprising an ownship data source configured to monitor the position of the aircraft, the controller coupled to the ownship data source and configured to generate the dynamic taxi turnoff icon to further include symbology representative of the current aircraft position along the runway.

8. The flight deck display system of claim 7 wherein the controller generates the symbology representative of the runway, the taxi exit, and the current aircraft position as two dimensional graphics.

9. The flight deck display system of claim 1 further comprising an autobrake system operably coupled to the controller and to which the controller supplies data indicative of at least one of $TS_{MAX}$ and the position of the $TS_{MAX}$ marker along the runway, the autobrake system configured to slow the aircraft in accordance with the data received from the controller prior to turnoff of the aircraft at the taxi exit.

10. The flight deck display system of claim 1 wherein the controller establishes $TS_{MAX}$ for the taxi exit by recalling from the memory a $TS_{MAX}$ value assigned to the runway cleared for usage by the aircraft.

11. The flight deck display system of claim 1 wherein the controller is configured to alter the appearance of the $TS_{MAX}$ marker if the separation between the point along the runway at which the aircraft speed is projected to decline to $TS_{MAX}$ and the taxi exit exceeds a predetermined threshold.

12. The flight deck display system of claim 1 wherein the controller is further configured to dynamically adjust the position of the $TS_{MAX}$ marker in response to a change in taxi exits at which the aircraft is expected to turn.

13. The flight deck display system of claim 1 wherein the controller is further configured to:
   calculate a predicted stopping distance of the aircraft along the runway; and
   generate the dynamic taxi turnoff icon to include symbology identifying the predicted stopping distance on the runway graphic.

14. The flight deck display system of claim 13 wherein the controller generates the two dimensional icon to have a first fixed positioning with respect to the FPM when the aircraft is cleared for takeoff from the runway and to have a second, different fixed positioning with respect to the FPM when the aircraft is cleared for landing at the runway.

15. The flight deck display system of claim 1 further comprising a datalink operably coupled to the controller, the controller enabling a value of $TS_{MAX}$ to be overridden by an Air Traffic Controller (ATC) via communications received via the datalink.

16. A method carried-out by the flight deck display system of an aircraft, the flight deck display system including a display device, a memory storing an airport map database, and a controller operably coupled to the display device and to the memory, the method comprising:
   recalling information from the airport map database pertaining to a runway cleared for usage by the aircraft;
   at the controller, identifying a taxi exit along the runway based on the information recalled from the airport map database;
   generating a three dimensional Primary Flight Display (PFD) on the display device;
   superimposing a two dimensional dynamic taxi turnoff icon over the three dimensional PFD, the two dimensional dynamic taxi turnoff icon including symbology representative of the runway and the location of the taxi exit along the runway;
   establishing a maximum turnoff speed ($TS_{MAX}$) for the taxi exit; and
   further generating the two dimensional dynamic taxi turnoff icon to include a $TS_{MAX}$ marker identifying a point along the runway at which the aircraft speed is projected to decline to $TS_{MAX}$.

* * * * *